United States Patent Office 3,181,160
Patented Apr. 27, 1965

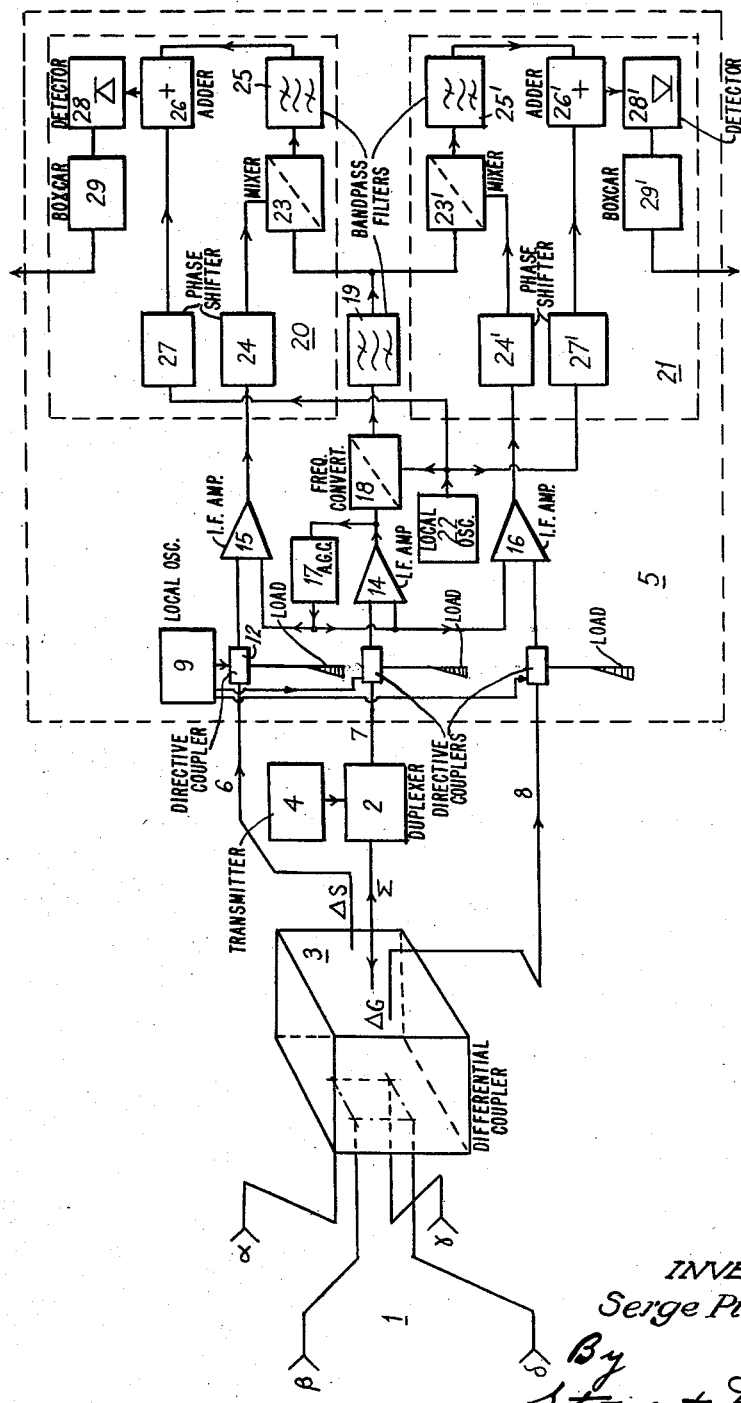

3,181,160
MONOPULSE RADIO-DETECTION RECEIVERS
Serge Pichafroy, Paris, France, assignor to Compagnie Francaise Thomson-Houston, Paris, France, a French body corporate
Filed May 22, 1961, Ser. No. 111,754
4 Claims. (Cl. 343—113)

The present invention relates to a receiver which may be used in radio-detection systems known as monopulse systems.

The receiver of such a system measures the angular separation in elevation and in bearing between the direction of the object and the direction in which the aerial is pointing. To this end a receiving aerial is constructed with several elements receiving the echo pulse sent back by the object. From the amplitudes of the signals received in these elements is determined the value of the angular separation.

It is known to construct aerial structures with four elements arranged at the angles of a square perpendicular to the axis of pointing and having either one horizontal diagonal or two horizontal sides.

Such a system first of all effects the comparison of the difference in elevation $\Delta S$ and the difference in bearing $\Delta G$ signals, obtained from the signals received following the same diagonal or the same side, with the reference signal $\Sigma$ obtained by calculating the sum of the signals received by all the receiver elements.

In order to make this comparison, a three channel receiver can be used in each of which channels a transposition in intermediate frequencies and amplification of the signals $\Delta G$, $\Delta S$ and $\Sigma$ are effected.

An automatic control system operates on the gains of the three amplifiers in such a way as to render them equal to $K/\Sigma$, K being a constant and $\Sigma$ the total amplitude of the signal.

Thus at the output of the three paths are obtained three pulse modulated voltages of amplitude $$\frac{K\Delta G}{\Sigma}, \frac{K\Delta S}{\Sigma}$$

and $$\frac{K\Sigma}{\Sigma}=K$$

By multiplying the two first by the last, two pulse modulated voltages of amplitude $$\frac{K^2\Delta G}{\Sigma}$$

and $$\frac{K^2\Delta S}{\Sigma}$$

are obtained which allow the desired angular separation in bearing and in elevation to be measured.

In order to multiply the intermediate frequency voltages, symmetrical multiplier circuits with non-linear characteristics, e.g. tube circuits, are generally used.

The voltages appearing at the output of these multipliers have two components which are modulated in amplitude. The carrier frequency of the one is double the intermediate frequency and it must be eliminated. The other has a very weak carrier frequency, which is substantially zero. This component is extracted with the aid of a low pass filter. It has two sub-components. One of them is constituted by the video frequency signals in a usable form, and the other is a very low frequency parasitic sub-component arising from the asymmetry of the elements of the multiplier device. It should be noted that this latter sub-component undergoes a drift due to the instabilities of the very low frequency electronic devices.

The receiver, which is the object of the present invention, does not have the aforementioned defects. It can be associated with a radio-detection system comprising one of the two types of aerials which have already been discussed. In this receiver, two voltages, the amplitudes of which are respectively proportional to $$\frac{\Delta G}{\Sigma}$$

and $$\frac{\Delta S}{\Sigma}$$

are alternating and have the same frequency. This latter is different from the intermediate frequency common to the two channels and from the frequencies of the parasitic components which can appear in the course of the frequency-changing or multiplication operations.

In a receiver according to the invention the three channels (the two difference channels and the sum channel) have, as is usual, a frequency converter with which is associated an oscillator of frequency $f_1$ but each of the difference channels, or preferably the sum channel, comprises a second converter with which is associated a local oscillator of frequency $f_2$ which is different from the first local frequency and from the first intermediate frequency $F-f_1$, F being the frequency of the echoes received. The voltage coming from the sum channel on the one hand and each of the voltages coming from the difference channels on the other hand are then mixed. The components having the frequency of the local oscillator associated with the second converter (or converters) of one of the types of channel are selected from the voltages produced by filtering. This is a pulse component and its amplitude is proportional to the product of the sum signal amplitude and the amplitude of one of the difference signals.

Each alternating voltage of frequency $f_2$ modulated by pulses is added to a sinusoidal voltage of the same frequency and, after the appropriate transformations, the resultant voltages are used to control the aerial's directing servo-mechanisms. The variations in amplitude of each of the voltages thus obtained and the directions of these variations are respectively a function of the two sum-difference products $\Sigma\Delta G$, and $\Delta\Sigma S$. According to the method of using these voltages produced by addition, it is desirable that their amplitude varies as the sum-difference products which they represent or, on the other hand, that these amplitudes vary in opposite directions to these products. In order that it may be so, each operation of addition is carried out after having regulated the phase shift of one of the voltages, to which it is applied, in relation to the other.

The alternating voltages obtained by addition must undergo a double transformation before being applied to the servo-mechanisms in order to control them. These alternating voltages are first of all detected and then the resultant pulse voltages are transformed into very wide square waves voltages by known devices called "box cars."

In order that the technical characteristics of the present invention may be better understood, an embodiment will be described, by way of example with reference to the accompanying drawings, in which the single figure is a block diagram of a monopulse radio-detection receiver according to the invention.

The radio-detection system in the figure comprises an aerial 1, which is connected to the duplexer 2 and to the receiver 5 by the differential coupler 3, the function of which will be explained later. Upon transmission the duplexer 2 directs the energy coming from the transmitter 4 towards the coupler 3, upon reception the energy received by the aerial and transmitted by this coupler 3 is fed to the three channels 6, 7 and 8 of the receiver, the duplexer 2 making sure that the energy which should reach the channel 7 is not directed towards the transmitter.

The aerial is essentially constituted by four radiating and receiving elements $\alpha$, $\beta$, $\gamma$, and $\delta$ which are arranged at the angles of a square, the plane of which is perpendicular to the pointing axis, two sides of the square being horizontal.

Upon transmission the differential coupler carries out the equal distribution of the energy produced by the transmitter between the four radiating elements of the aerial. Upon reception the latter respectively receive signals, $a$, $b$, $c$ and $d$, which are generally different and which are applied to the four inputs of the differential coupler 3. The latter combines the signals which are applied to it in a linear manner and produces A sum signal $\Sigma = a+b+c+d$
An elevation-difference signal $\Delta S = (a+b)-(c+d)$
And a bearing-difference signal $\Delta G = (a+d)-(b+c)$ These signals are respectively applied to the outputs indicated by the symbols $\Sigma$, $\Delta S$ and $\Delta G$.

In each channel of the receiver the signals with a high frequency $F$ undergo a transposition of frequency. To this end a local oscillator 9 of frequency $f_1$ is connected by means of the guide 10 and the directive couplers 11, 12 and 13 to the sum channel and to the two difference channels respectively. In each of said directive couplers 11, 12 and 13, the signals are mixed with the local oscillator signal, the outputs thereof being fed to the respective amplifiers 14, 15 and 16 with an intermediate frequency $F-f_1$. Each directive coupler is also provided with a terminating load. An automatic gain control device 17 fed from the amplifier 14 is associated with all three amplifiers and has the effect of making the amplitude of the signal produced by the amplifiers constant. A second frequency converter 18 forms part of the sum channel and a local oscillator 22 of frequency $f_2$ different from $f_1$ is associated with it. A pass-band filter 19 selects the useful component of the voltage produced by the frequency converter; this filter has a mean frequency of, for example, $F-f_1+f_2$. It should be noted that, if desired, the component of frequency $F-f_1-f_2$ of the voltage produced by the mixer 18 may be used. The mean frequency of the filter 19 should then therefore be modified.

The voltage transmitted by this filter is applied to two identical operative devices 20 and 21, each of which has two functions. The device 20 serves to effect the product of the sum signals transmitted by the filter 19 and the difference-in-elevation signals. Furthermore this device carries out the addition of the pulse modulated alternating voltage which represents this product and a voltage of frequency $f_2$, the resultant voltage being used, after suitable transformation, to control the servomechanisms for pointing in elevation. The device 21 is identical to the device 20 but it operates on the sum voltage and the bearing difference voltage. It produces a voltage which is also used after transformation to control the bearing pointing servo-mechanisms. Since the devices 20 and 21 are identical only one of them will be described. Similar members of the two devices are indicated by the same reference numerals but those of the device 21 are distinguished by a prime.

The filter 19 is connected to the first input of the mixer 23 which forms part of the device 20. The amplifier 15 of the elevation-difference channel is connected to the second input of the mixer 23 either directly or preferably through a phase shifter 24, which has the task of rendering the transmission times through the sum channel and the elevation-difference channel equal. That component is selected from among the components of the voltage produced by the mixer 23 which has a frequency $f_2$ equal to the difference between the second intermediate frequency $F-f_1+f_2$ of the signals transmitted by the sum channel and the intermediate frequency $F-f_1$ of the signals transmitted by the elevation-difference channel. This selection is carried out by the pass-band filter 25, the mean frequency of which is that of the local oscillator 22. The selected component of frequency $f_2$ has an amplitude proportional to the product $\Sigma.\Delta S$ of the amplitudes of the signals transmitted by the sum and elevation-difference channels.

This pulse modulated voltage of frequency $f_2$ is added to the voltage coming from the local oscillator 22 in the device 26. In order to increase the variations of amplitude of the voltage produced by the adder as much as possible, the voltage of the local oscillator 22 is transmitted to it preferably by a phase shifter 27. The latter is regulated so that the relative phasing of the voltages applied to the inputs of the adder be zero or equal to $\pi$. Two regulations of the phase shifter 27 can thus be effected for a given value of the angular error signal, whether the amplitude of the voltage produced by the adder increases during the echo pulses or decreases.

The voltage produced by the adder is applied to a detector 28; a pulse voltage is then obtained which is transformed into voltages with wide square waves (almost direct voltage) by a known device 29 called a "box car." The elevation pointing servo-mechanisms may be controlled by the voltage which appears at the output of the device 29. It should be noted that the sum channel can comprise only one single frequency converter, whereas the two difference channels have two. The second converter of each of these channels is then followed by a filter which is connected to the mixer of the device 20 and 21. In this case the amplifier 14 of the sum channel is followed by a phase shifter, the output of which is connected to the second input of the mixers 23 and 23'.

The voltage appearing at the output of the adder 26 has an alternating component of constant amplitude during the intervals between the pulses. It is important that the amplitude between the pulses of the voltage is not small in relation to the amplitude of these pulses for in this condition the distribution of the amplitudes of the noise component which obeys Rayleigh's law is then close to a Gauss distribution. Under these conditions the voltage produced by the adder 26 is practically zero when there is no angular error of the antenna.

It should be noted that in the devices 20 and 21 and the adders 26 and 26' can be replaced by another device, a multiplier for example. The use of such a multiplier has the advantage of allowing the more efficient elimination of the parasitic components of the voltage produced by this device.

With the receiver 5, one may alternatively use an aerial, the elements of which are arranged at the angles of the square having a horizontal diagonal perpendicular to the pointing axis. The only diffierence relates to the coupling device which connects the elements of the aerial and the three reception channels.

I claim:

1. Receiver for a monopulse radio detection system of the type which makes use of variations in the amplitude of the difference in elevation signal $\Delta S$ and of the difference in bearing signals $\Delta G$ in relation to the sum amplitude $\Sigma$ of the signals and comprising two difference channels to which said difference signals are fed and a sum channel to which the sum amplitude signal is fed, frequency converter means fed with the signals from the two difference channels and the sum channel, a local oscillator producing a frequency $f_1$ which is fed to the frequency converter means to produce an intermediate frequency, an intermediate frequency amplifier for each of said channels connected to the output of the frequency converter means, a second frequency converter means associated with the sum channel, a second local oscillator for feeding the second frequency converter means and which produces a frequency $f_2$ different from the first local oscillator frequency $f_1$ and from the intermediate frequency, two mixer circuits connected in the two difference channels and which respectively multiply the voltage $\Sigma$, with the voltages $\Delta S$ and $\Delta G$, and means for selecting the alternating component of frequency $f_2$ and of amplitude proportional to the product of the sum signal and the respective difference signals ($\Sigma.\Delta S, \Sigma.\Delta G$) from the output of each of the mixer circuits.

2. Receiver as claimed in claim 1, in which the output from each mixer circuit is applied to an adder circuit which is also fed with the local oscillator frequency $f_2$, a detector fed with the output of the adder circuit for producing a pulse voltage and a box car circuit fed from the detector for producing a square wave output.

3. Receiver as claimed in claim 2, in which the local oscillator frequency $f_2$ is applied to the adder circuit through a phase shifter such that the alternating voltage from the adder varies in amplitude according to whether or not the sum voltage $\Sigma$ and the respective difference voltages $\Delta S$, $\Delta G$ are in phase.

4. Receiver for a monopulse radio detection system of the type which makes use of the variations in the amplitude of the difference in elevation signals $\Delta S$ and of the difference in bearing signals $\Delta G$ in relation to the sum amplitude $\Sigma$ of the signals and comprising two difference channels to which said difference signals are fed and a sum channel to which the sum amplitude signal is fed, frequency converter means fed with the signals from the two difference channels and the sum channel, a local oscillator producing a frequency $f_1$ which is fed to the frequency converter means to produce an intermediate frequency, an intermediate frequency amplifier for each of said channels connected to the output of the frequency converter means, second frequency converter means associated with at least one of the channels, a second local oscillator for feeding the second frequency converter means and which produces a frequency $f_2$ different from the first local oscillator frequency $f1$ and from the intermediate frequency, two mixer circuits connected to the at least one channel which is not connected to the second frequency converter circuit and which respectively multiply the voltage $\Sigma$ with the voltages $\Delta S$ and $\Delta G$ and means for selecting the alternating component of frequency $f_2$ and of an amplitude proportional to the product of the sum signal and of the respective difference signals ($\Sigma.\Delta S, \Sigma.\Delta G$) from the output of each of the mixer circuits.

References Cited by the Examiner
UNITED STATES PATENTS

| | | | |
|---|---|---|---|
| 2,830,288 | 4/58 | Dicke | 343—16 |
| 2,934,757 | 4/60 | Haefer | 343—16 |
| 2,988,739 | 6/61 | Haefer et al. | 343—16.1 |
| 3,012,222 | 12/61 | Hagemann | 343—16.1 |

CHESTER L. JUSTUS, *Primary Examiner.*